United States Patent [19]

Sanders et al.

[11] Patent Number: 5,048,856
[45] Date of Patent: * Sep. 17, 1991

[54] GOLF TROLLEY

[75] Inventors: Mark A. Sanders, Windsor; Derek D. Roberts, Holyport, both of England

[73] Assignee: Acushnet Limited, United Kingdom

[*] Notice: The portion of the term of this patent subsequent to Oct. 9, 2007 has been disclaimed.

[21] Appl. No.: 533,466

[22] Filed: Jun. 5, 1990

Related U.S. Application Data

[63] Continuation of Ser. No. 271,899, Nov. 15, 1988, Pat. No. 4,961,593.

[30] Foreign Application Priority Data

Nov. 18, 1987 [GB] United Kingdom ............... 8726958

[51] Int. Cl.⁵ .............................................. B62B 1/04
[52] U.S. Cl. ................................. 280/646; 280/47.24; 280/652; 280/DIG. 6
[58] Field of Search ............. 280/DIG. 6, 47.24, 646, 280/652, 655

[56] References Cited

U.S. PATENT DOCUMENTS

| | | | |
|---|---|---|---|
| D. 302,616 | 8/1989 | Hartmann | D34/15 |
| 2,626,814 | 1/1953 | Chamberlin | 280/DIG. 6 |
| 2,914,336 | 11/1959 | Hibben, Jr. et al. | 280/DIG. 6 |
| 2,957,707 | 10/1960 | Zagwyn | 280/DIG. 6 |
| 3,167,146 | 1/1965 | Rudolph | 280/DIG. 5 |
| 3,172,681 | 3/1965 | Moses | 280/47.19 |
| 3,191,957 | 6/1965 | Meiklejohn | 280/DIG. 6 |
| 3,223,430 | 12/1965 | Fitzsimmons | 280/42 |
| 3,820,617 | 6/1974 | Groff | 280/DIG. 5 |
| 3,918,735 | 11/1975 | Denzer et al. | 280/DIG. 6 |
| 4,142,736 | 3/1979 | Ackerfeldt et al. | 280/652 |
| 4,550,930 | 11/1985 | Proffit | 280/655 |
| 4,679,817 | 7/1987 | Schufer | 280/655 |
| 4,793,622 | 12/1988 | Sydlow | 280/40 |

Primary Examiner—David M. Mitchell
Assistant Examiner—Eric Culbreth
Attorney, Agent, or Firm—Lucas & Just

[57] ABSTRACT

A lightweight, collapsible golf trolley is disclosed comprising an extruded elongate chassis member 1 of lightweight metal or alloy, e.g. aluminium. The chassis member 1 is of an inverted channel section with two downwardly and outwardly flared side wall sections 2, 3 against which are pivoted the wheel struts 4, 5 which are likewise lightweight alloy extrusions. Preferably the struts are in two halves forming a parallel linkage with the chassis and the wheel brackets 13. Hinged to the forward end of the chassis is a handle 27 which can be folded to a position alongside the chassis thus collapsing the wheel struts via the tie 37.

25 Claims, 5 Drawing Sheets

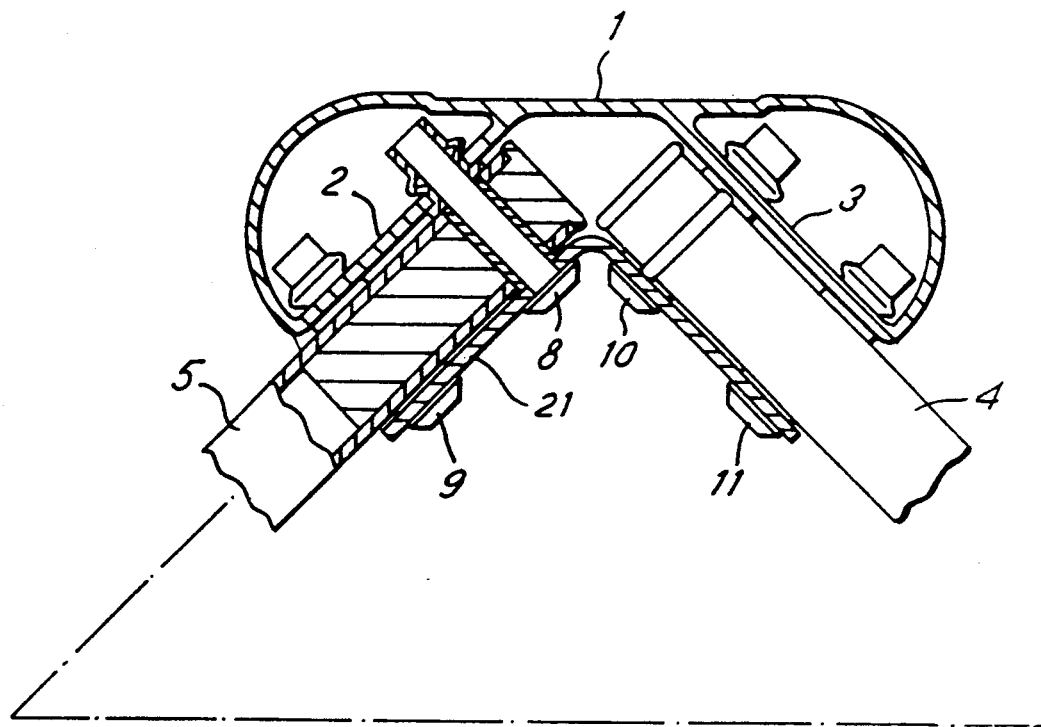
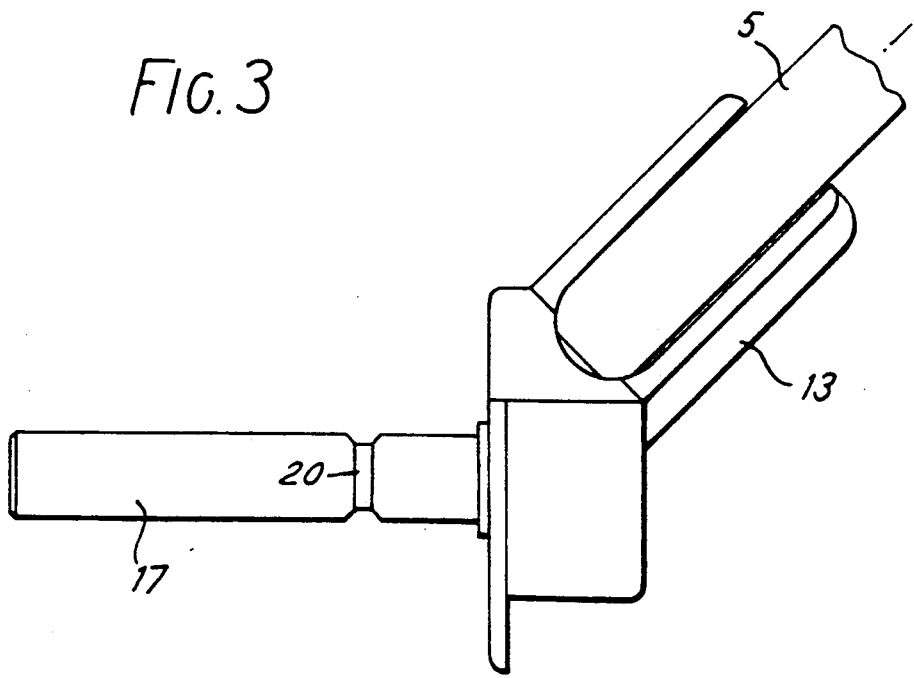
FIG. 3

GOLF TROLLEY

This application is a continuation of application Ser. No. 271,899 filed Nov. 15, 1988, now U.S. Pat. Ser. No. 4,961,593.

This invention relates to golf trolleys.

Golf trolleys are used by many golfers to transport the golf bag containing their golf clubs around the golf course, instead of carrying the bag on their shoulder. The majority of golf trolleys in use today are of a common design comprising a wheeled chassis having two wheeled struts splayed on either side from an elongate chassis member to which the bag is secured, the two wheel struts carrying ground engaging wheels at their distal ends. The two wheels and one end of the elongate chassis member form a triangular base upon which the trolley stands to support the bag in an inclined position as the golfer plays his shot. At the opposite end the elongate chassis member is provided with an elongated handle extending substantially coaxially from the chassis member, and by means of which the trolley can be wheeled or pulled behind the player as he goes around the course. Often, but not always, the trolley is collapsible or foldable for ease of transportation, for example in the boot or trunk of a car.

Existing golf trolleys tend to be fairly heavy constructions, which are often aesthetically unpleasing, often off tubular iron or steel members prone to rust and corrosion, and comprising welded joints or brackets, which are liable to fracture.

By contrast the present invention seeks to provide a lightweight, collapsible golf trolley which is of aesthetically pleasing design, easy and inexpensive to manufacture and free of welded joints and other weaknesses and trouble spots.

This is achieved essentially by forming the elongate main chassis member of the trolley of extruded lightweight alloy, e.g. aluminium, and pivoting the wheel struts, which are preferably also of extruded lightweight alloy, directly to the chassis. For this purpose the chassis has an extrudable inverted channel shaped section (inverted, that is, in relation to the ground when the trolley is in use), that channel shaped extrudable section moreover having two downwardly and outwardly flared wall sections symmetrically disposed on opposite sides of the median plane of the extruded chassis member, those two outwardly flared wall sections being set at a predetermined angle corresponding to the angle adopted by the wheel struts in their splayed position, the wheel struts being pivoted to the underside of the extruded chassis member against said outwardly flared wall sections.

At its opposite ends, the elongate, extruded chassis member is provided with upstanding means for receiving and retaining the golf bag in a reclining position on and parallel to the chassis member. Preferably such bag receiving means are in the form of moulded plastics end caps on the ends of the elongate chassis member each shaped to receive the golf bag and preferably provided with means, e.g. slots, for receiving a strap, or other fastening means by which the bag can be fastened securely to the trolley.

In customary manner, the trolley is provided with an elongate handle pivotally connected to one end of the elongate chassis member, and pivotable with respect thereto from a first, extended position in which the handle extends substantially coaxially from the chassis member to permit the trolley to be pulled or wheeled by the user, to a second, collapsed position in which the handle is folded back and lies essentially alongside the chassis member and substantially parallel thereto. Tie means are provided operatively connected between the handle and the wheel struts so that as the handle pivots into its second, or folded position, the wheel struts pivot from their splayed position into a folded position in which they lie approximately parallel to the chassis member with the wheels, which are mounted at the distal ends of the wheel struts, lying close to the end of the chassis member remote from the handle and on opposite sides thereof. For further ease of transport of the trolley when in the collapsed or folded position, the wheels can be made disconnectable from the wheel struts.

Although not essential to the concept of this invention, means will usually be provided for locking the handle relative to the chassis in its extended position, and possibly also in the collapsed or folded position to prevent the trolley from unfolding when being carried in the folded condition. Also the angle of the handle, when its extended position, may be adjustable relative to the chassis member so that it can be adjusted to the height of the user. For similar reasons, the handle may be telescopic.

A further significant feature which contributes substantially to the aesthetic appearance and improved construction of the trolley, at least in its preferred form, is the construction of the wheel struts. Preferably these each comprise two parallel links running the length of the wheel strut and pivoted at one end to the underside of the elongate chassis member, and at the other end to a wheel bracket, thus forming a parallel linkage. Even more preferably the two parallel links of each strut are of extruded, preferably identical, open channel shaped sections, the free edges of the two opposite sidewalls of each channel shaped link slidably mating one with the other, so that externally each strut visually has the appearance of a single, solid member.

To summarize, in its principal aspect, the present invention resides in a collapsible golf trolley comprising an elongate extruded chassis member of lightweight alloy forming the principal structural element of the trolley, and comprising an inverted channel shaped extrusion whose sidewalls diverge outwardly and downwardly symmetrically on opposite sides of a median plane at a predetermined angle thereto, a pair of lightweight alloy wheel struts pivotally connected at one end to the underside of said elongate extruded chassis member intermediate the ends thereof and normally lying at an angle to each other on opposite sides of said median plane and as determined by the angle of said downwardly divergent sidewalls, said wheel struts each carrying at their distal ends on opposite sides of the trolley a ground engaging wheel, upwardly extending means at each end of the elongate extruded chassis member for receiving and retaining thereon a golf bag containing a plurality of golf clubs, an elongate handle pivotally connected to said elongate extruded chassis member at one end and pivotable between a first, extended position in which the elongate handle extends from the elongate extruded chassis member in a direction generally coaxial therewith and a second, collapsed position in which the elongate handle substantially lies alongside the elongate extruded chassis member, and tie means operatively connected between said handle and said wheel struts, whereby, when the handle is in its first, extended position the wheel struts are splayed outwardly on opposite sides of the trolley at said predetermined angle, and, when the handle is in its second, collapsed position, the wheel struts pivot inwardly towards the elongate extruded chassis member so as to lie, in the collapsed condition of the trolley, substantially alongside the elongate extruded chassis member with the wheels closely adjacent thereto on opposite sides.

Preferably each wheel strut comprises two parallel members, each pivotally connected at one end to the underside of said elongate extruded chassis member and at the other end to a wheel bracket mounting said wheel and forming therewith a parallel linkage constrained to move between said splayed and collapsed positions, each in an oppositely inclined plane defined by the angles of said downwardly divergent sidewalls.

Even more preferably each of said two parallel members of each wheel strut are generally channel shaped in cross-section, and the free edges of the opposite sidewalls defining each channel slidably mate one within the other.

A preferred construction of golf trolley according to this invention is illustrated by the accompanying drawings in which:

FIG. 3 is a section taken on the line III—III of FIG. 1, but showing only one wheel strut in full, and with wheel removed;

Figure 9:
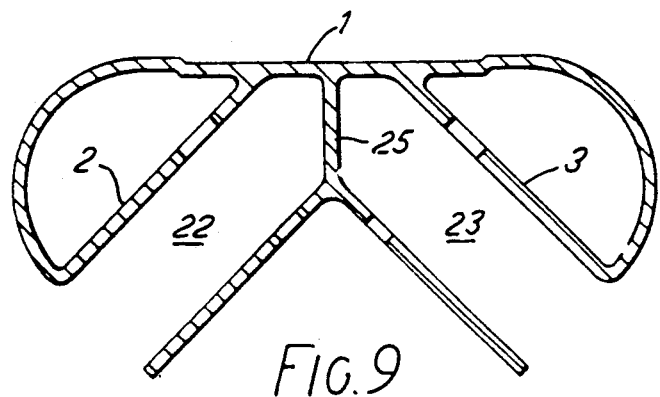
FIG. 9 shows an alternative cross-section for the main chassis member.

Referring to the drawings, the trolley comprises an extruded, elongate chassis member 1 of lightweight alloy, e.g. extruded aluminium, having the extrudable cross-section shown in FIG. 3. An alternative extrudable cross-section is shown in FIG. 9. As will be seen, the chassis member 1 has an inverted channel shaped section defined on opposite sides of the median plane by two symmetrical downwardly and outwardly flared wall sections 2,3. These two wall sections are at a predetermined angle to each other corresponding to the angle between the wheel struts, 4,5 at least when splayed on either side of the chassis, see FIG. 2.

Figure 5:
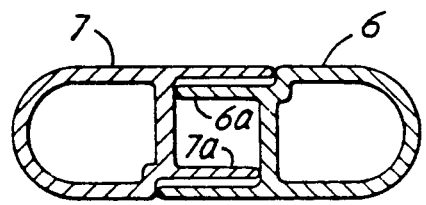
FIG. 5 is a section through the wheel strut taken on line V—V of FIG. 4.
Figure 4:
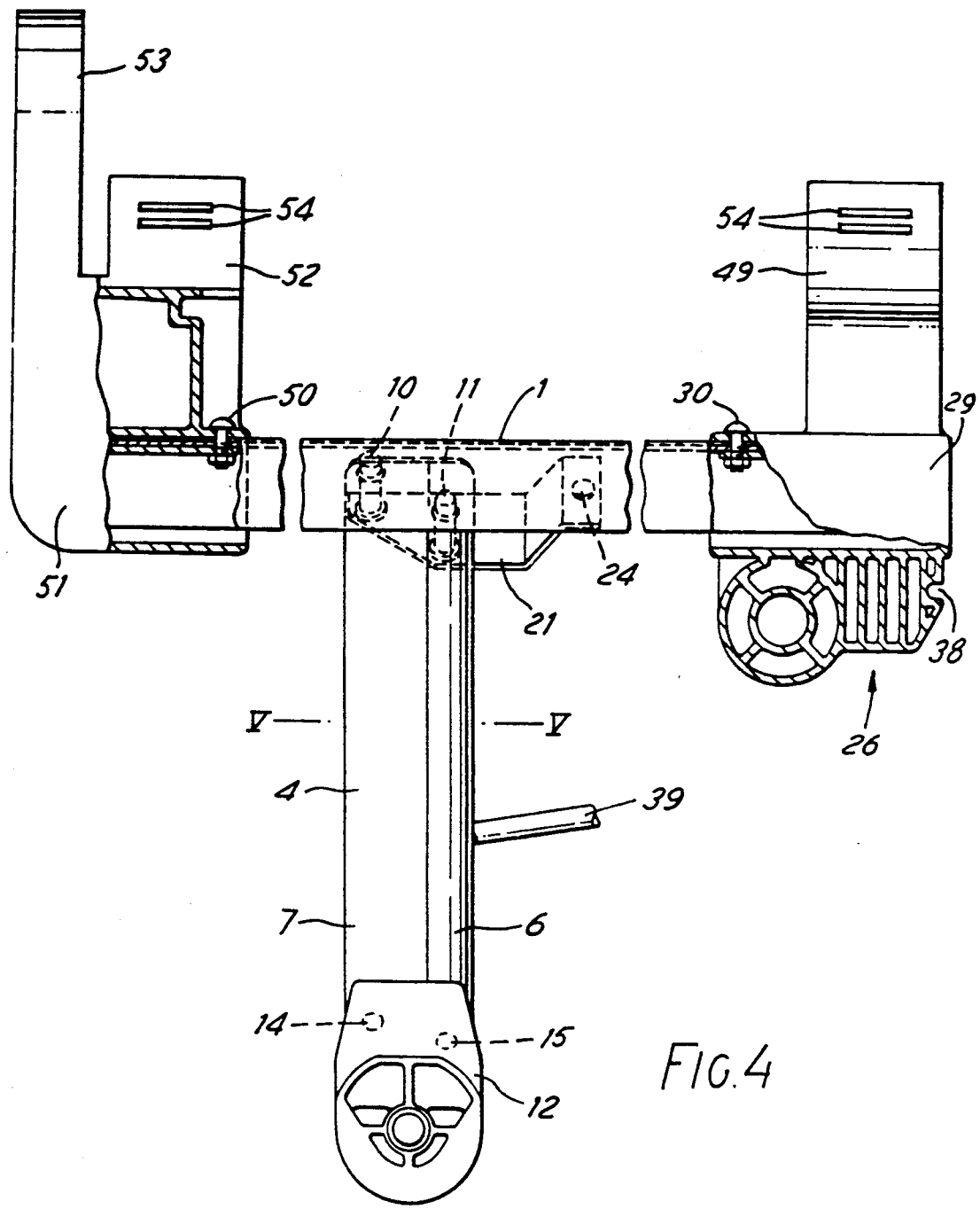
FIG. 4 is a detailed side view of the chassis and wheel strut assembly and showing the bag receiving end caps on the chassis in part section.
Figure 6:
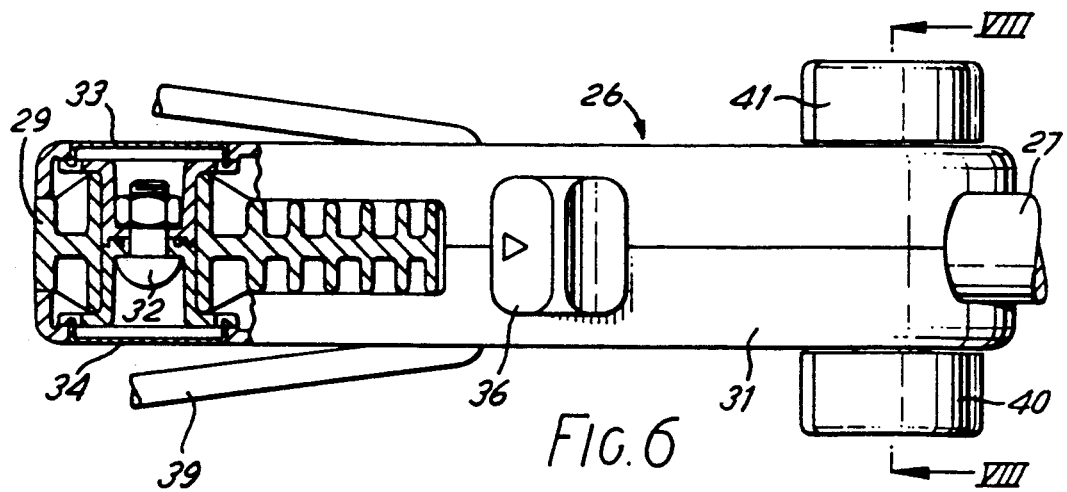
FIG. 6 is a plan view, part broken away, of the mounting bracket for the handle.

The two wheel struts, shown in more detail in FIGS. 4 and 5, each comprise two lightweight alloy, e.g. aluminium or aluminium alloy extrusions 6, 7 which are of identical channel or U-shaped extrudable cross-section, see FIG. 5. On one side of each extrusion, the distal or upper edge of each channel shaped extrusion 6, 7 is offset inwardly towards the median plane of the extrusion as at 6a and 7a, so that the two channel shaped extrusions 6,7 slidably mate one with the other. The two struts thus have the external appearance of a single, solid strut, FIGS. 1 and 4.

However, the two extrusions 6, 7 of each wheel strut 4, 5; in fact, form two parallel links in a parallel linkage constituted by those two extrusions, and by the extruded chassis member 1 at one end to which those extrusions are pivotally connected by means of the pivot pins 8, 9, 10, 11 (FIG. 3) and by the wheel brackets 12, 13 to which those extrusions are pivotally connected by the pins 14, 15. Each wheel strut 4, 5 is thus constructed of a parallel linkage the members of which are constrained to pivot in a plane inclined to one side or other of the median plane of the trolley, the inclination of that plane being determined by the angle of the extruded inclined side wall sections 2, 3 of the extruded chassis member 1.

The wheel mounting brackets 12, 13 are each plastics mouldings pivotally connected to the distal ends of each wheel strut 4, 5 by the pins 14, 15, as indicated, and each carry an outwardly projecting stub axle 16, 17 on which is mounted a wheel 18, 19. Each wheel is preferably so mounted as to be easily detachable from its respective mounting, for example, the hub of each wheel may be provided on the inside (not shown) with a spring loaded plunger which engages in a circumferential groove 20 provided on each axle, thereby to releasably retain the wheel on the axle.

To complete the mounting of the wheel struts 4, 5 to the chassis 1, an angled sheet metal clamping bracket 21 is provided which fits in the channel on the underside of the extruded chassis member 1 in space relation to the inclined side walls 2, 3 so as to define a parallel sided socket 22, 23 (see FIG. 9) defined on one side by the inclined sidewalls 2, 3 and on the other by the bracket 21, and into which are received the proximal ends of the two extrusions 6, 7 forming the wheel struts 4, 5 to be pivotally secured therein by the pins 8, 9, 10, 11. The angle bracket 21 is fastened, e.g. by rivetting, to the underside of the chassis as at 24.

In the alternative cross-section for the chassis member 1 shown in FIG. 9, the bracket 21 is replaced by a Y-shaped web 25 integrally extruded with the chassis member 1, and having its two arms lying parallel to the sidewalls 2, 3 to define the parallel sided socket 22, 23 which receives the proximal ends of the wheel struts, not shown in FIG. 9.

To conform to the elegant, aesthetic profile and lightweight construction, the wheels 18, 19 are preferably solid, lightweight alloy, e.g. aluminium castings, rather than spoked, and will generally be provided with solid rubber tires.

Turning now to FIGS. 1, 4 and 6 to 8, affixed to the upper end (when in the standing position shown in FIG. 1) of the chassis member 1 is a handle mounting bracket 26, preferably but not necessarily of moulded plastics material, in which is pivotally mounted the handle 27 provided at its distal end with an angular grip portion 28.

The handle mounting bracket 26 is in two parts, a fixed part 29 fastened to the end of the chassis member 1 by the nut and bolt 30, and a movable part 31, hinged to the fixed part 29 by the nut and bolt 32. For aesthetic reasons, and to protect the hinge, the nut and bolt 32 is located within recesses on opposite sides of the handle mounting bracket and covered by snap-in spring cover plates 33, 34.

In the extended position of the handle shown in the Figures, the two parts 29, 31 of the hinged handle mounting bracket are locked together by a spring loaded pin 35 slidably movable in the part 31 by the button 36 against the bias of the spring 37. In the locked position the pin 35 engages in a detent recess 38 provided in the fixed part 29, see more particularly 4. As will be apparent release of the pin 35 from the detent 38 against the spring 37 permits the handle to pivot about the hinge axis provided by the bolt 32 into the position shown in phantom in FIG. 1, i.e. in which the handle 27 is swung back between the wheel struts 4, 5 to lie substantially parallel to the chassis member 1. During this movement the wheel struts 4, 5 are caused to pivot inwardly towards the chassis member 1 about their respective pivots 8, 9, 10, 11 by a V-shaped tie 39 connected between the movable part 31 of the handle mounting bracket 26 and the wheel struts 4, 5.

Figure 1:
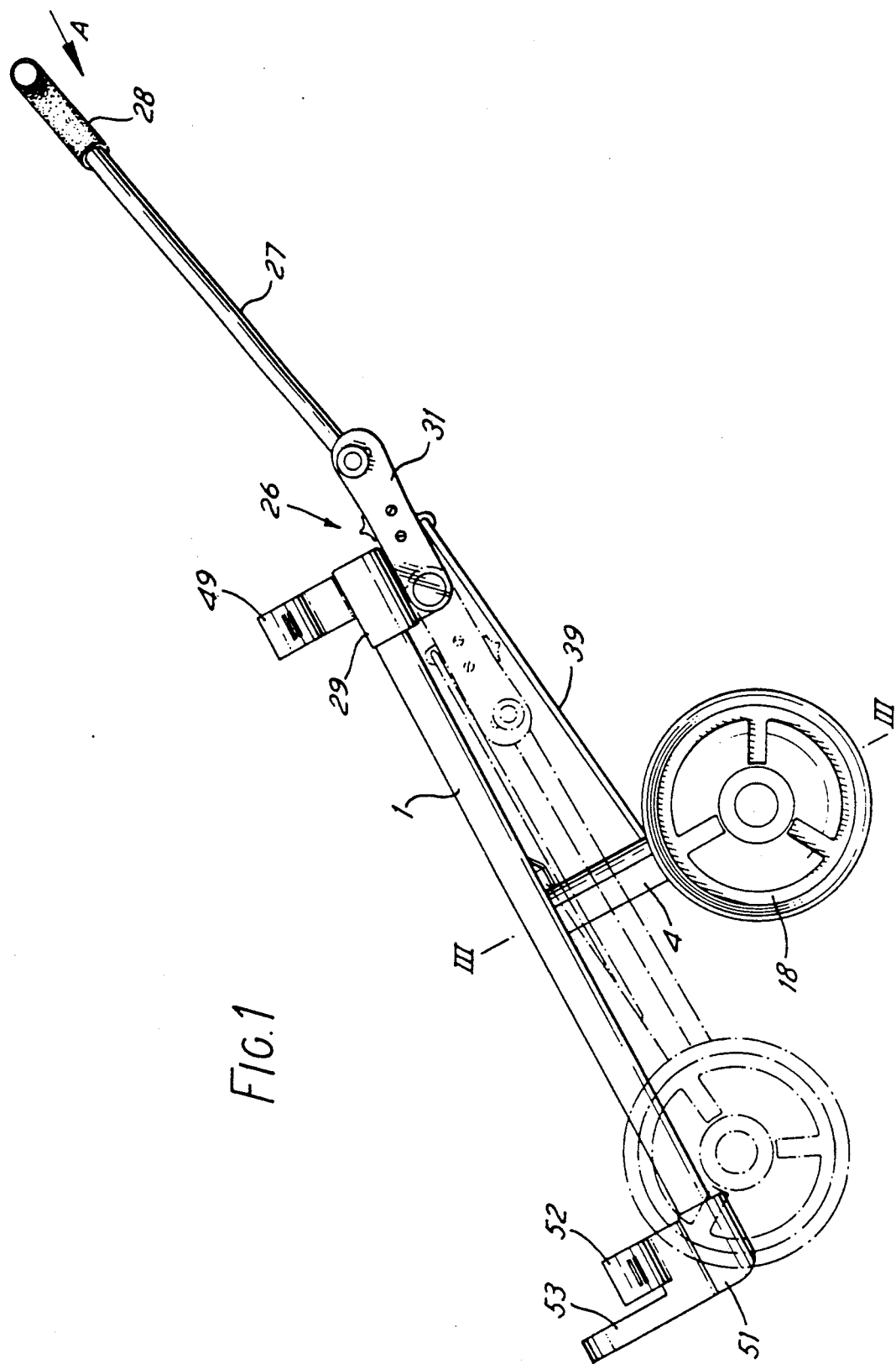
FIG. 1 is a side view of the trolley with the handle in its extended position, and showing the collapsed or folded position in phantom.
Figure 2:
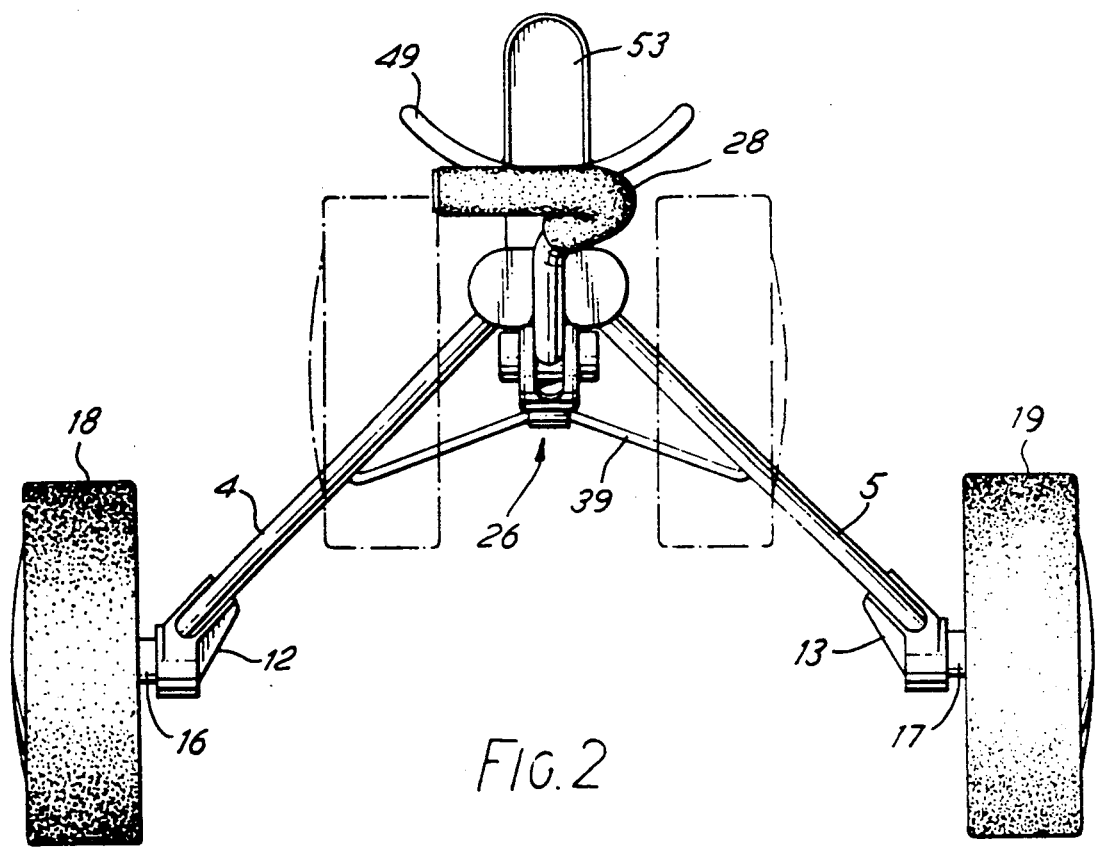
FIG. 2 is an end on view of the trolley taken in the direction of the arrow A in FIG. 1, and again showing the collapsed position of the wheels in phantom. The position of the handle and wheel struts in the collapsed or folded position are omitted for the sake of clarity.

As a result of this action, the wheel struts and wheels (if not removed) are caused to adopt the collapsed or folded position shown in phantom in FIG. 1 and 2, i.e. lying substantially parallel to the chassis member 1, with wheels 18, 19 swung inwardly towards the chassis so as to adopt the position shown in phantom in FIGS. 1 and 2, i.e. with the wheels close to and on opposite sides of the end of the chassis member 1 remote from the handle 27.

Opening of the trolley from its collapsed or folded position is achieved by the reverse action.

To complete the further description of the trolley, the movable part 31 of the handle mounting bracket 26 is formed from two complementary moulded shells 31a, 31b clamped together primarily by the nut and bolt 32, but also by two knurled finger knobs 40, 41 threadedly mounted on the ends of a common shaft 42. Clamped between the two shells 31a, 31b of the movable part 31 of the handle mounting bracket 26 is the proximal end of the handle 27, which is pivotally mounted between said shells by the pivot pin 43. As will be apparent, the angle of the handle 27 relative to the chassis member can easily be adjusted to suit the height of different users by releasing one or other of the finger knobs 40, 41, repositioning the handle angularly with respect to the handle mounting bracket 26, and retightening the finger knobs 40, 41.

Figure 7:
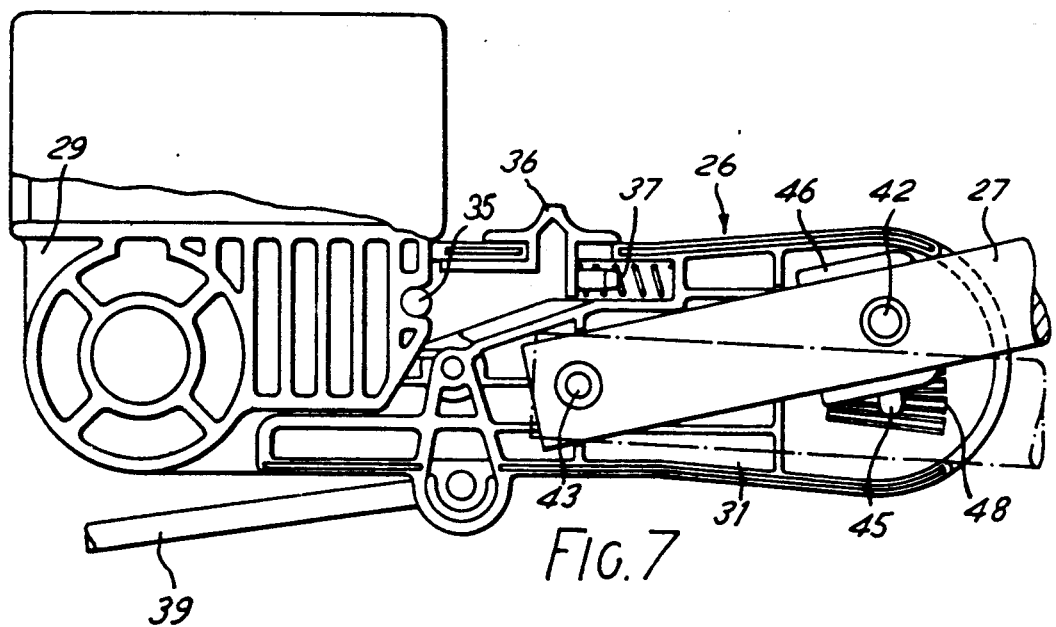
FIG. 7 is a side view of the mounting bracket for the handle, with one side cover remove to show the internal construction.
Figure 8:
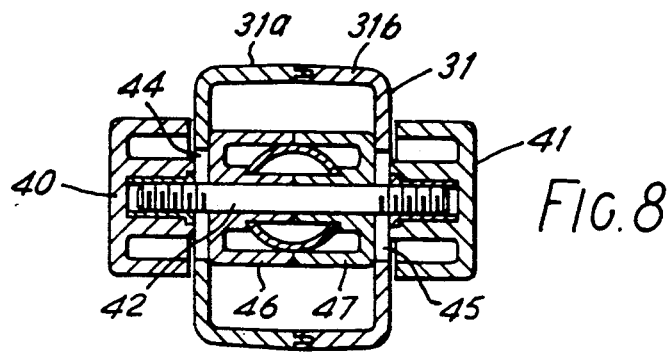
FIG. 8 is a section taken along line VIII—VIII of FIG. 6.

As will be seen particularly from FIGS. 7 and 8, the shaft 42 connecting the two knobs 40, 41, passes through the handle 27 and is located in two arcuate aligned guide slots 44, 45 in the two shells 31a, 31b. Two intermediate clamping pieces 46, 47 are provided on opposite sides of the handle to apply clamping pressure to the handle, see FIG. 8. To provide positive angular positioning of the handle 27, the opposite inside face of the two shells are provided with a radial array of ridges 48, which mate with a corresponding array, or simply a roughened surface, on the corresponding face of the clamping pieces 46, 47.

Finally, extending from the upper side of the fixed part 29 of the handle mounting bracket 26 is an integrally formed, upwardly curved arcuate seating 49 for the upper end of the golf bag, not shown. Similarly mounted on the opposite end of the chassis member 1 and fastened thereto by a nut and bolt 50 is a second moulded plastics mounting bracket 51 with a similar curved seating 52 for the lower end of the golf bag, and an upwardly extending stop 53 which engages the bottom of the golf bag when positoned on the trolley. Each of the curved seatings for the golf bag has a pair of slots 54 at each end through which a fastening strap, not shown, can be threaded for the purpose of securing the bag firmly to the trolley.

Whilst the above description relates to a preferred embodiment, it will be apparent that numerous modifications can be made therein, e.g. in the particular cross-section of the extruded members, and in other features, without departing from the concept of the invention herein described, and as hereinafter claimed.

We claim:

1. In a collapsible golf trolley having an elongate chassis member forming the principal structural element of the trolley, a pair of wheel struts pivotally connected at one end to the chassis member intermediate the ends thereof and normally lying at an angle to each other on opposite sides of the median plane of the trolley, the wheel struts each carrying at their distal ends on opposite sides of the trolley a ground engaging wheel, upwardly extending bag bracket means at each end of the chassis member for receiving and retaining thereon a golf bag, an elongate handle pivotally connected to said chassis member at one end and pivotable between a first, extended position in which the handle extends from the chassis member in a direction generally coaxial therewith and a second, collapsed position in which the handle substantially lies alongside the chassis member, and rigid link means connected directly between the handle and the wheel struts, whereby, when the handle is in its first, extended position the wheel struts are splayed outwardly on opposite sides of the trolley, and, when the handle is in its second, collapsed position, the wheel struts pivot inwardly towards the chassis member so as to lie, in the collapsed condition of the trolley, substantially alongside the chassis member with the wheels closely adjacent thereto on opposite sides, the improvements comprising:
   (a) the chassis member comprising an elongated, inverted channel-shaped, lightweight alloy extrusion having a cross-section that is uniform along the length of the extrusion, said cross-section providing on the underside of the chassis member a pair of downwardly divergent sidewalls defining the opposite sides of the inverted channel, and;
   (b) each of the wheel struts being pivotally mounted at their proximal ends in said inverted channel.

2. The golf trolley of claim 1 wherein the ground wheels are mounted on the wheel struts by means of respective wheel brackets.

3. the golf trolley of claim 2 wherein the wheel brackets have quick release means permitting easy detachment of each wheel from its respectively mounting.

4. The golf trolley of claim 1 wherein the channel of the chassis member has an angled clamping bracket fitted therein in spaced relation to the sidewalls so as to define parallel side sockets, which sockets receive the respective proximal ends of each of the wheel struts, the proximal ends of the wheel struts being retained in their respective sockets by means of pivot pins through the sidewalls, the bracket and the proximal ends of the wheel struts.

5. The golf trolley of claim 1 wherein the chassis member has, in cross-section, an integral Y-shaped web positioned on the median plane of the chassis member between the sidewalls, the two arms of the Y-shaped web being located in spaced relation to the sidewalls so as to define parallel sided sockets, which sockets receive the respective proximal ends of each of the wheel struts, the proximal ends of the wheel struts being retained in their respective sockets by means of pivot pins through the sidewalls, the arms of the Y-shaped web, and the proximal ends of the wheel struts.

6. The golf trolley of claim 1 wherein releasable locking means are provided for releasably locking the elongate handle in its coaxially extended position relative to the chassis member.

7. The golf trolley of claim 1 wherein the angle of the elongate handle in its first, extended position, relative to the axis of the chassis member, is adjustable.

8. The golf trolley of claim 1 wherein the bag bracket means comprise molded plastics end caps fitted on the ends of the chassis member and shaped to receive the golf bag therein, said end caps further comprising slots for receiving a fastening strap for fastening the golf bag to the trolley.

9. The golf cart of claim 1 wherein the chassis member and the wheel struts are all of extruded aluminum alloy.

10. A collapsible golf trolley comprising:
(a) an elongated extruded chassis member forming the principal structural element of the trolley and consisting of an elongated, inverted channel-shaped, lightweight alloy extrusion having a cross-section that is uniform along the length of the extrusion, said cross-section providing on the underside of the chassis member a pair of downwardly divergent sidewalls defining the opposite sides of the inverted channel;
(b) a pair of wheel struts pivotally connected at their proximal ends to the downwardly divergent sidewalls on the underside of the channel-shaped chassis member;
(c) a wheel bracket pivotally connected to the distal ends of each wheel strut;
(d) a ground wheel detachably mounted on each wheel bracket; and
(e) upwardly extending bracket means at each end of the chassis for receiving and retaining thereon a golf bag.

11. The golf trolley of claim 10 further comprising:
(a) an elongate handle pivotally connected to said chassis member at one end and pivotable between a first, extended position in which the handle extends from the chassis member in a direction generally coaxial therewith and a second, collapsed position in which the handle lies substantially alongside the chassis member; and
(b) rigid link means connected directly between the handle and the wheel struts so that, when the handle is in its first, extended position, the wheel struts are splayed outwardly on opposite sides of the trolley and, when the handle is in its second, collapsed position, the wheel struts pivot inwardly towards the chassis member so as to lie, in the collapsed condition of the trolley, substantially alongside the chassis member with the wheels closely adjacent thereto on opposite sides.

12. The golf trolley of claim 11 wherein releasable locking means are provided for releasably locking the elongate handle in its coaxially extended position relative to the chassis member.

13. The golf trolley of claim 11 wherein the angle of the elongate handle in its first, extended position, relative to the axis of the chassis member, is adjustable.

14. The golf trolley of claim 10 wherein the channel of the chassis member has an angled clamping bracket fitted therein in spaced relation to the sidewalls so as to define parallel sided sockets, which sockets receive the respective proximal ends of each of the wheel struts, the proximal ends of the wheel struts being retained in their respective sockets by means of pivot pins through the sidewalls, the bracket, and the proximal ends of the wheel struts.

15. The golf trolley of claim 10 wherein the chassis member has in cross-section, an integral Y-shaped web positioned on the median plane of the chassis member between the sidewalls, the two arms of the Y-shaped web being located in spaced relation to the sidewalls so as to define parallel sided sockets, which sockets receive the respective proximal ends of each of the wheel struts, the proximal ends of the wheel struts being retained in their respective sockets by means of pivot pins through the sidewalls, the arms of the Y-shaped web, and the proximal ends of the wheel struts.

16. The golf trolley of claim 10 wherein the bag bracket means comprise molded plastics end caps fitted on the ends of the chassis member and shaped to receive the golf bag therein, said end caps further comprising slots for receiving a fastening strap for fastening the golf bag to the trolley.

17. The golf trolley of claim 10 wherein the chassis member and the wheel struts are all of extruded aluminum alloy.

18. In a collapsible golf trolley having an elongate chassis member forming the principal structural element of the trolley, a pair of wheel struts pivotally connected at one end to the chassis member intermediate the ends thereof and normally lying at an angle to each other on opposite sides of the median plane of the trolley, the wheel struts each carrying at their distal ends on opposite sides of the trolley a ground engaging wheel, upwardly extending bag bracket means at each end of the chassis member for receiving and retaining thereon a golf bag, an elongate handle pivotally connected to said chassis member at one end and pivotable between a first, extended position in which the handle extends from the chassis member in a direction generally coaxial therewith and a second, collapsed position in which the handle substantially lies alongside the chassis member, and rigid link means connected directly between the handle and the wheel struts, whereby, when the handle is in its first, extended position the wheel struts are splayed outwardly on opposite sides of the trolley, and, when the handle is in its second, collapsed position, the wheel struts pivot inwardly towards the chassis member so as to lie, in the collapsed condition of the trolley, substantially alongside the chassis member with the wheels closely adjacent thereto on opposite sides, the improvements comprising:
(a) the chassis member comprising an elongated, inverted channel-shaped, lightweight alloy extrusion having a cross-section that is uniform along the length of the extrusion, said cross-section providing on the underside of the chassis member a pair of downwardly divergent sidewalls defining the opposite sides of the inverted channel;
(b) each of the wheel struts being pivotally mounted at their proximal ends in said channel; and
(c) an angled clamping bracket fitted in said channel of the chassis member and in spaced relation to the sidewalls so as to define parallel sided sockets, which sockets receive the respective proximal ends of each of the wheel struts, the proximal ends of the wheel struts being retained in their respective sockets by means of pivot pins through the sidewalls, the bracket and the proximal ends of the wheel struts.

19. A collapsible golf trolley comprising:
(a) an elongated extruded chassis member forming the principal structural element of the trolley and consisting of an elongated, inverted channel-shaped, lightweight alloy extrusion having a cross-section that is uniform along the length of the extrusion, said cross-section providing on the underside of the chassis member a pair of downwardly divergent sidewalls defining the opposite sides of the inverted channel;
(b) a pair of wheel struts pivotally connected at their proximal ends to the downwardly divergent sidewalls on the underside of the channel-shaped chassis member;
(c) a wheel bracket pivotally connected to the distal ends of each wheel strut;
(d) a ground wheel detachably mounted on each wheel bracket;
(e) upwardly extending bracket means at each end of the chassis for receiving and retaining thereon a golf bag; and
(f) an angled clamping bracket fitted in said channel of the chassis member and in spaced relation to the sidewalls so as to define parallel sided sockets, which sockets receive the respective proximal ends of each of the wheel struts, the proximal ends of the wheel struts being retained in their respective sockets by means of pivot pins through the sidewalls, the bracket, and the proximal ends of the wheel struts.

20. In a collapsible golf trolley having an elongate chassis member forming the principal structural element of the trolley, a pair of wheel struts pivotally connected at one end of the chassis member intermediate the ends thereof and normally lying at an angle to each other on opposite sides of the median plane of the trolley, the wheel struts each carrying at their distal ends on opposite sides of the trolley a ground engaging wheel, upwardly extending bag bracket means at each end of the chassis member for receiving and retaining thereon a golf bag, an elongate handle pivotally connected to said chassis member at one end and pivotable between a first, extended position in which the handle extends from the chassis member in a direction generally coaxial therewith and a second, collapsed position in which the handle substantially lies alongside the chassis member, and rigid link means connected directly between the handle and the wheel struts, whereby, when the handle is in its first extended position the wheel struts are splayed outwardly on opposite sides of the trolley, and, when the handle is in its second, collapsed position, the wheel struts pivot inwardly towards the chassis member so as to lie, in the collapsed condition of the trolley, substantially alongside the chassis member with the wheels closely adjacent thereon on opposite sides, the improvements comprising:

(a) the chassis member comprising an elongated, inverted channel-shaped, lightweight alloy extrusion having a cross-section that is uniform along the length of the extrusion, said cross-section providing on the underside of the chassis member a pair of downwardly divergent sidewalls defining the opposite sides of the inverted channel;
(b) each of the wheel struts being pivotally mounted at their proximal ends in said inverted channel; and
(c) a bracket means attached to said chassis member and positioned in spaced relation to the sidewalls so as to define parallel sided sockets, which sockets receive the respective proximal ends of each of the wheel struts, the proximal ends of the wheel struts being retained in their respective sockets by means of pivot pins through the sidewalls, the bracket means and the proximal ends of the wheel struts.

21. The golf trolley of claim 20 wherein the bracket means is an angled clamping bracket.

22. The golf trolley of claim 20 wherein the bracket means is, in cross-section, an integral Y-shaped web positioned on the median plane of the chassis member between the sidewalls, the two arms of the Y-shaped web being located in spaced relation to the sidwalls so as to define the parallel sided sockets.

23. A collapsible golf trolley comprising:
(a) an elongated extruded chassis member forming the principal structural element of the trolley and consisting of an elongated, inverted channel-shaped, lightweight alloy extrusion having a cross-section that is uniform along the length of the extrusion, said cross-section providing on the underside of the chassis member a pair of downwardly divergent sidewalls defining the opposite sides of the inverted channel;
(b) a pair of wheel struts pivotally connected at their proximal ends to the downwardly divergent sidewalls on the underside of the channel-shaped chassis member;
(c) a wheel bracket pivotally connected to the distal ends of each wheel strut;
(d) a ground wheel detachably mounted on each wheel bracket;
(e) upwardly extending bracket means at each end of the chassis for receiving and retaining thereon a golf bag; and
(f) a bracket means attached to said chassis member and positioned in spaced relation to the sidewalls so as to define parallel sided sockets, which sockets receive the respective proximal ends of each of the wheel struts, the proximal ends of the wheel struts being retained in their respective sockets by means of pivot pins through the sidewalls, the bracket means and the proximal ends of the wheel struts.

24. The golf trolley of claim 23 wherein the bracket means is an angled clamping bracket.

25. The golf trolley of claim 23 wherein the bracket means is in cross-section, an integral Y-shaped web positioned on the median plane of the chassis member between the sidewalls, the two arms of the Y-shaped web being located in spaced relation to the sidewalls so as to define parallel sided sockets.

* * * * *